United States Patent
Oguma et al.

(10) Patent No.: US 9,229,666 B2
(45) Date of Patent: Jan. 5, 2016

(54) DEVICE REGISTRATION SYSTEM AND METHOD

(71) Applicant: KYOCERA Document Solutions Inc., Osaka (JP)

(72) Inventors: Takashi Oguma, Osaka (JP); Tetsuya Nishino, Osaka (JP)

(73) Assignee: KYOCERA Document Solutions Inc. (JP)

( * ) Notice: Subject to any disclaimer, the term of this patent is extended or adjusted under 35 U.S.C. 154(b) by 2 days.

(21) Appl. No.: 14/311,567

(22) Filed: Jun. 23, 2014

(65) Prior Publication Data

US 2014/0376051 A1    Dec. 25, 2014

(30) Foreign Application Priority Data

Jun. 21, 2013    (JP) ................................. 2013-130817

(51) Int. Cl.
*G06F 3/12* (2006.01)
*H04B 5/00* (2006.01)

(52) U.S. Cl.
CPC ............ *G06F 3/1231* (2013.01); *G06F 3/1204* (2013.01); *G06F 3/1226* (2013.01); *G06F 3/1286* (2013.01); *G06F 3/1292* (2013.01); *H04B 5/0056* (2013.01)

(58) Field of Classification Search
CPC ... G06F 3/1231; G06F 3/1286; G06F 3/1292; G06F 3/1204
See application file for complete search history.

(56) References Cited

U.S. PATENT DOCUMENTS

2014/0085663 A1*   3/2014   Kavanappillil et al. ...... 358/1.15

FOREIGN PATENT DOCUMENTS

WO    2006/048804 A1    5/2006

* cited by examiner

*Primary Examiner* — Mohammad Ghayour
*Assistant Examiner* — Lennin RodriguezGonzalez
(74) *Attorney, Agent, or Firm* — McDonnell Boehnen Hulbert & Berghoff LLP

(57) ABSTRACT

A device registration system includes a network, an image forming apparatus, a mobile terminal communicatively connected to the network via an access point, and a server. The image forming apparatus comprises an image forming apparatus near field communication (NFC) unit configured to perform wireless communication with the mobile terminal. The mobile terminal comprises a mobile terminal NFC unit configured to perform wireless communication with the image forming apparatus. The server is configured to register setting information associated with the image forming apparatus in a search list, wherein the setting information includes (i) position information indicative of a location of the image forming apparatus and (ii) tag information representative of a text label that describes the image forming apparatus.

10 Claims, 5 Drawing Sheets

| MODEL NAME | HOST NAME | IP ADDRESS | SERIAL ID | POSITION INFORMATION | TAG INFORMATION | STATUS |
|---|---|---|---|---|---|---|
| k1 | n1 | a1 | s1 | x1,y1 | 3F-SE | NORMAL |
| k2 | n2 | a2 | s2 | x2,y2 | 1F-NW | NORMAL |
| k3 | n3 | a3 | s3 | x3,y3 | 2F-SW | NORMAL |
| k4 | n4 | a4 | s4 | x4,y4 | 2F-SE | ERROR |
| k5 | n5 | a5 | s5 | x5,y5 | 3F-NE | NORMAL |

Fig. 4

DEVICE REGISTRATION SYSTEM AND METHOD

INCORPORATION BY REFERENCE

This application is based upon, and claims priority to corresponding Japanese Patent Application No. 2013-130817, filed in the Japan Patent Office on Jun. 21, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to a device registration system and method in which a device connected to a network is registered in a search list.

BACKGROUND

A typical image forming apparatus connected to a network, such as a multifunction peripheral (MFP), a printer, or the like, can be accessed from a variety of computing devices, such as cellular phones, smart phones, or mobile terminals.

A typical registration method involves a domain manager permitting an external apparatus to operate as a member of an authorized domain—such as a home network—and registering the external apparatus. However, the typical registration method requires a user authentication apparatus to be installed, and the domain manager has to confirm whether the external apparatus is permitted to operate as a member of the authorized domain and whether the external apparatus is registered by using the user authentication apparatus, resulting in a complicated operation of registering the external apparatus.

SUMMARY

The present disclosure relates to a device registration system and method.

In one embodiment, a device registration system includes a network, an image forming apparatus, a mobile terminal communicatively connected to the network via an access point, and a server. The image forming apparatus comprises an image forming apparatus near field communication (NFC) unit configured to perform wireless communication with the mobile terminal. The mobile terminal comprises a mobile terminal NFC unit configured to perform wireless communication with the image forming apparatus. The server is configured to register setting information associated with the image forming apparatus in a search list, wherein the setting information includes (i) position information indicative of a location of the image forming apparatus and (ii) tag information representative of a text label that describes the image forming apparatus.

In another embodiment, a device registration method includes the steps of performing, via a near field communication (NFC) unit of an image forming apparatus, wireless communication with a mobile terminal; performing, via an NFC unit of the mobile terminal, wireless communication with the image forming apparatus; and registering, via a server, setting information associated with the image forming apparatus in a search list, wherein the setting information includes (i) position information indicative of a location of the image forming apparatus and (ii) tag information representative of a text label that describes the image forming apparatus.

In yet another embodiment, a system includes an image forming apparatus, a mobile terminal, and a non-transitory computer-readable medium having instructions stored thereon that, when executed by a processor, performs a set of functions. The image forming apparatus includes an image forming apparatus near field communication (NFC) unit configured to perform wireless communication. The mobile terminal includes a mobile terminal NFC unit configured to perform wireless communication. The set of functions includes registering setting information associated with the image forming apparatus in a search list, wherein the setting information includes (i) position information indicative of a location of the image forming apparatus and (ii) tag information representative of a text label that describes the image forming apparatus.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

FIG. 4 is a schematic diagram illustrating an example search list screen displayed on the mobile terminal.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

In an embodiment of the present disclosure, responsive to a user putting a mobile terminal at a position close to an image forming apparatus, the mobile terminal may establish a connection with the image forming apparatus via near field communication (NFC) or the like. Then, the image forming apparatus may transmit its setting information to the mobile terminal. The mobile terminal may also display the received setting information of the image forming apparatus. Further, the user may input information representing an installed position of the image forming apparatus (hereinafter, referred to as "position information") from the mobile terminal. Further still, the user may also input information attached to identify the image forming apparatus easily (hereinafter, referred to as "tag information") from the mobile terminal. The mobile terminal may add the "position information" and the "tag information" to the setting information of the image forming apparatus, and may also transmit the setting information to the image forming apparatus. Responsive to receiving the setting information of the image forming apparatus, to which the "position information" and the "tag information" are added, the image forming apparatus may transmit the setting information to a server. The server may register the received setting information of the image forming apparatus, to which the "position information" and the "tag information" are added, in a search list.

Figure 1:
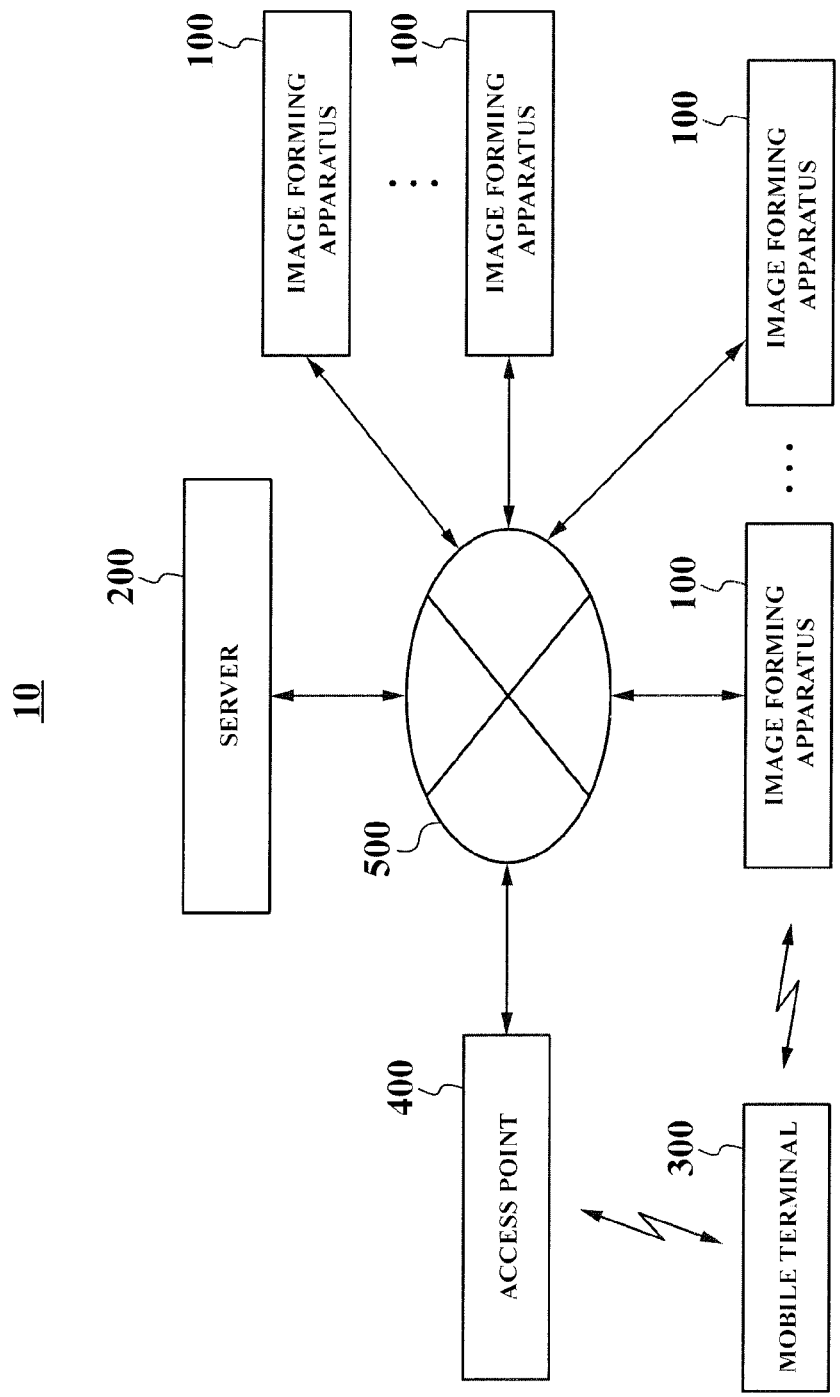
FIG. 1 is a schematic diagram illustrating the configuration of a device registration system according to an embodiment of the present disclosure.

The system configuration of a device registration system according to an embodiment of the present disclosure is depicted in FIG. 1. A device registration system 10 illustrated in FIG. 1 includes a plurality of image forming apparatuses 100, a server 200, a mobile terminal 300, an access point 400, and a network 500.

An image forming apparatus 100 may be, for example, a printer, an MFP, or the like. The image forming apparatus 100 may include a near field communication function.

The server 200 may be configured to register an image forming apparatus 100 in the search list. In addition, the server 200 may be configured to install and/or upgrade security software in the image forming apparatus 100. Further, the server 200 may be configured to distribute a pattern file. Further still, the server 200 may be configured to set and distribute a policy, which may include authorization information for defining limitations on use of the image forming apparatus 100. The server 200 may also be configured to monitor and report an operation state of the security software. The server 200 may further be configured to include status information and warnings transmitted by the image forming apparatus 100.

The mobile terminal 300 may be portable and may include a near field communication function. The mobile terminal 300 can be connected to a network 500 via the access point 400. Therefore, the mobile terminal 300 can access any image forming apparatus of the plurality of image forming apparatuses 100 and the server 200 which are connected to the network 500.

The access point 400 may function as a relay apparatus to enable the mobile terminal 300 to be connected to the network 500 via a provider or the like.

The network 500 may be, for example, an IP (Internet Protocol) network, such as the Internet or an intranet, and is connected to the image forming apparatuses 100, the server 200, and the access point 400.

Figure 2:
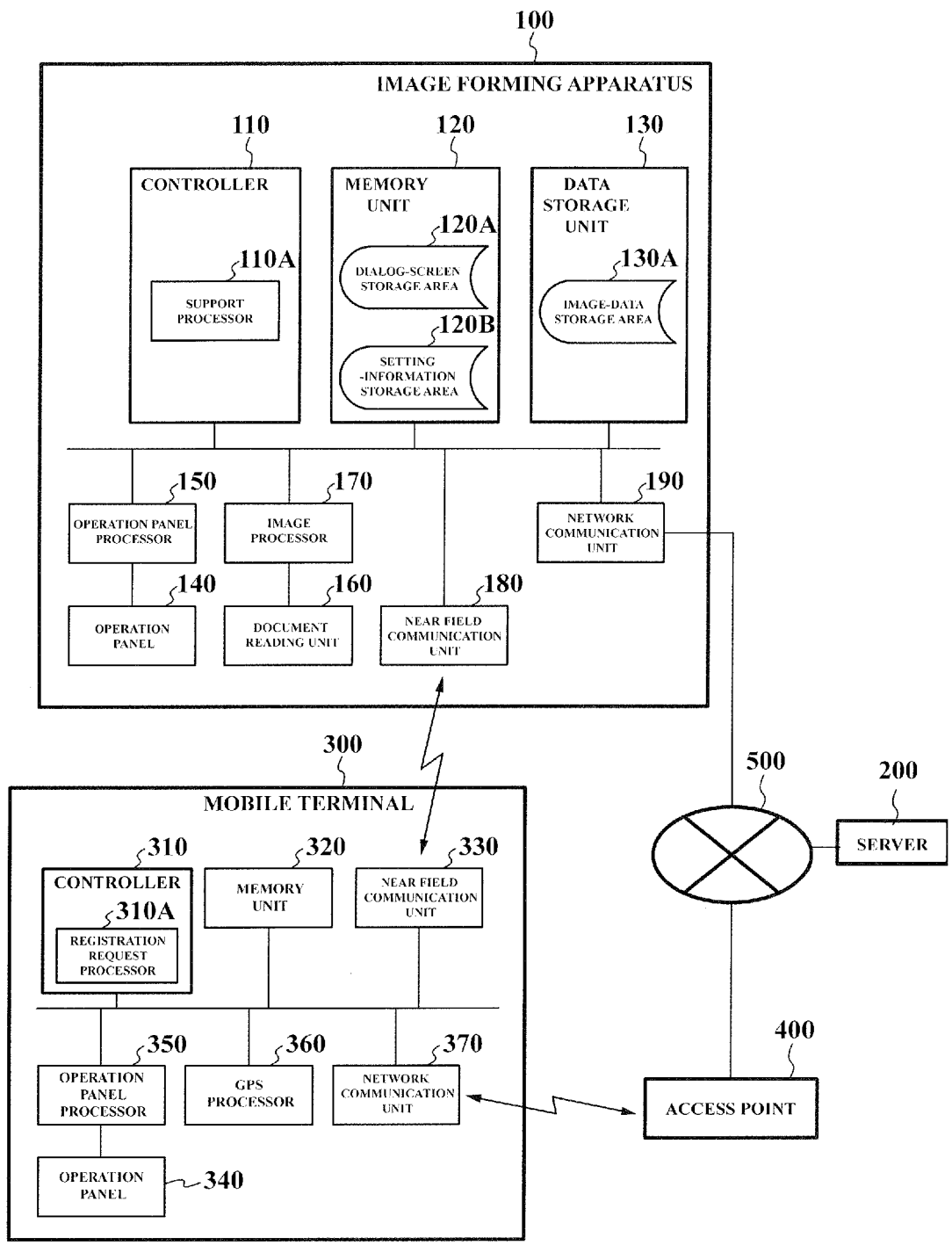
FIG. 2 is a schematic diagram illustrating the functional block configuration of an image forming apparatus and a mobile terminal in the device registration system.

The functional configuration of an image forming apparatus 100 is depicted in and will be described with respect to FIG. 2. The image forming apparatus 100 illustrated in FIG. 2 may include a controller 110, a memory unit 120, a data storage unit 130, an operation panel 140, an operation panel processor 150, a document reading unit 160, an image processor 170, a near field communication unit 180, and a network communication unit 190, which are connected to each other via a bus or the like. The controller 110 may include a support processor 110a. The memory unit 120 may include a dialog-screen storage area 120a and a setting-information storage area 120b. The data storage unit 130 may include an image-data storage area 130a.

The controller 110 may also include one or more storage devices, such as a random-access memory (RAM) and/or a read-only memory (ROM), and a control device such as a central processing unit (CPU). The controller 110 may be configured to control components of the image forming apparatus 100, interfaces of the image forming apparatus 100 such as various types of input/output (I/O) and Universal Serial Bus (USB), and a bus controller.

In order to support the server 200, the support processor 110a may transmit a first dialog screen 610 (illustrated in FIG. 3A) for allowing a user to input authentication information and view the displayed setting information of the image forming apparatus 100. Then, the support processor 110a may transmit a second dialog screen 620 (illustrated in FIG. 3B) for allowing a user to input the "position information" and the "tag information" to the mobile terminal 300. The first dialog screen 610 and the second dialog screen 620 will be described in detail below. The support processor 110a may transmit the setting information of the image forming apparatus 100 received from the mobile terminal 300, to which the "position information" and the "tag information" are added, to the server 200.

The memory unit 120 may be an auxiliary storage device such as a flash memory, and includes programs and data for processes performed by the controller 110.

The dialog-screen storage area 120a includes data associated with the first dialog screen 610 and the second dialog screen 620, which may be transmitted to the mobile terminal 300.

The setting-information storage area 120b may include device information, such as a model name, a host name, an IP address, a serial ID, and the like, any of which may be set for the image forming apparatus 100.

The data storage unit 130 may be any computer readable and recordable medium, such as a hard disk drive, and may include data and programs. The image-data storage area 130a of the data storage unit 130 includes images scanned by the document reading unit 160 and images received from the mobile terminal 300 via the network communication unit 190.

The operation panel 140 may display an operation screen and receive an operation performed by a user. For example, the operation panel processor 150 may display the operation items corresponding to the functions provided by the image forming apparatus 100, on the operation panel 140, and may also receive a user's operations from the operation panel 140.

When a user provides an instruction, via operation panel 140, to perform a read-out operation, the document reading unit 160 scans a document placed on the document plate of the image forming apparatus 100, converts the read-out data into an image, and outputs it to the image processor 170. The image processor 170 may then receive the image from the document reading unit 160, convert the image into a printable image or image data for transmittal by fax or email, and output it to the controller 110.

The near field communication unit 180 may perform wireless communication in a short distance with the mobile terminal 300 via Bluetooth™ or infrared communication in compliance with a near field communication standard.

The network communication unit 190 may include a detachable local-area network (LAN) interface, and is connected to the network 500. The LAN interface includes a network unit that performs intelligent transmission/reception using various network protocols, such as Transmission Control Protocol/Internet Protocol (TCP/IP), AppleTalk™, or Server Message Block (SMB), among other network protocols.

The functional configuration of the mobile terminal 300 is depicted in and will be described with respect to FIG. 2. The mobile terminal 300 as illustrated in FIG. 2 includes a controller 310, a memory unit 320, a near field communication unit 330, an operation panel 340, an operation panel processor 350, a global positioning system (GPS) processor 360, and a network communication unit 370, which are connected to each other via a bus or the like. The controller 310 may include a registration request processor 310a.

The controller 310 may also include storage devices, such as a RAM and/or a ROM, and a control device, such as a CPU. The controller 310 may be configured to control components of the entire mobile terminal 300, interfaces of the mobile terminal 300 such as various types of I/O and USB, and a bus controller.

The registration request processor 310a may transmit a request to register an image forming apparatus 100 in the search list in the server 200, to the image forming apparatus 100.

The memory unit 320 may be an auxiliary storage device such as a flash memory, and includes programs and data for processes performed by the controller 310.

The near field communication unit 330 may perform wireless communication in a short distance with the image forming apparatus 100 via Bluetooth™ or infrared communication in compliance with a near field communication standard.

The operation panel 340 may display an operation screen and receive an operation performed by a user. For example, the operation panel processor 350 may display the operation items corresponding to the functions provided by the mobile terminal 300 on the operation panel 340, receive user's operations from the operation panel 340, and display the first dialog screen 610 and the second dialog screen 620.

The GPS processor 360 may be configured to obtain the current position of the mobile terminal 300 via a GPS unit or the like.

The network communication unit 370 is connected to the network 500 via the access point 400.

The first dialog screen 610 and the second dialog screen 620 are depicted in and will be described with respect to FIG. 3A and FIG. 3B.

Figure 3:
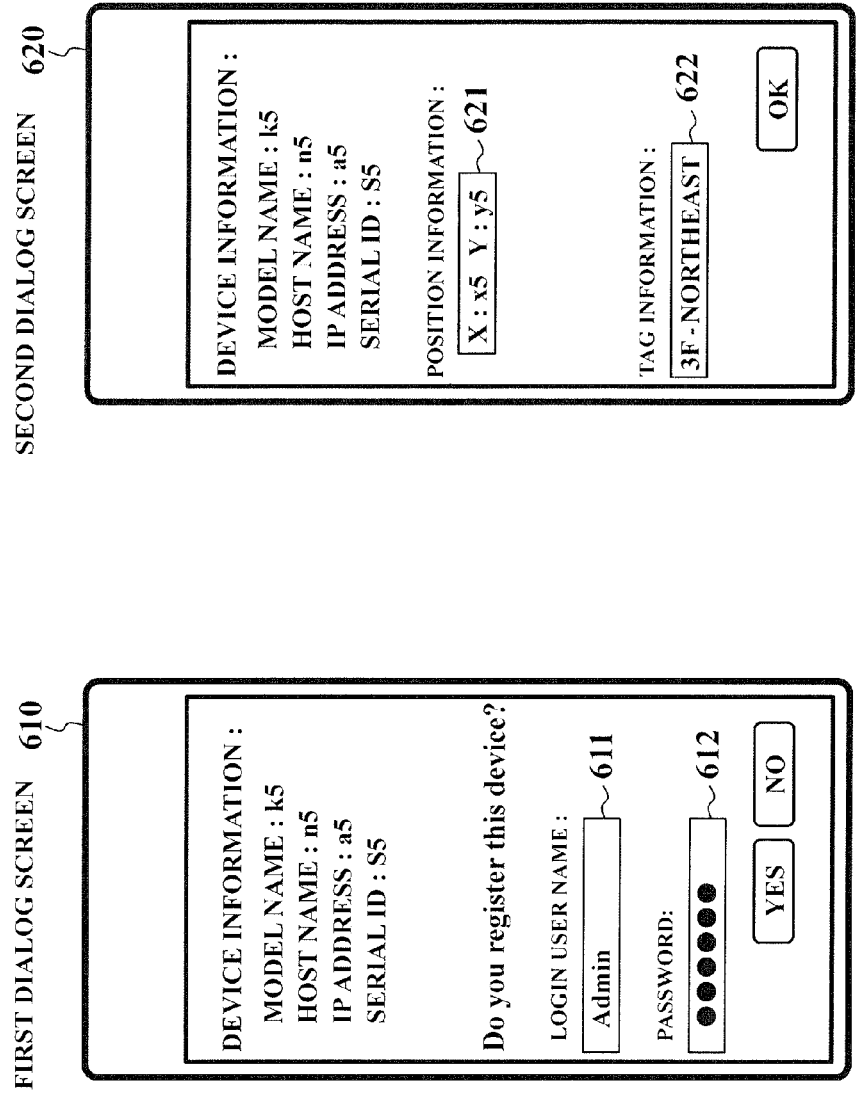
FIGS. 3A and 3B are schematic diagrams illustrating example dialog screens displayed on the mobile terminal.

The first dialog screen 610 illustrated in FIG. 3A is a screen for displaying the setting information included in the setting-information storage area 120b of the image forming apparatus 100. The first dialog screen 610 may also display input areas designated for inputting information for authenticating a user. For example, the first dialog screen 610 may include a login user name area 611 for inputting a "login user name" and a password area 612 for inputting a "password".

The second dialog screen 620 illustrated in FIG. 3B is a screen for displaying input areas designated for inputting information to be added to the setting information. For example, the second dialog screen 620 may display, when the user is successfully authenticated from the first dialog screen 610, areas for inputting the "position information" and the "tag information" that are added to the setting information. The second dialog screen 620 includes a position information area 621 for inputting the "position information" and a tag information area 622 for inputting the "tag information". In one example, the tag information includes details of the position information. In FIG. 3B, the tag information includes a floor number (3F) of a building and a cardinal direction (northeast). Then, the setting information may be transmitted to the image forming apparatus 100.

A search list screen 700 of the server 200 is depicted in and will be described with respect to FIG. 4. As illustrated in FIG. 4, the search list screen 700 is a screen for displaying the setting information of the image forming apparatus 100, in which the "position information" and the "tag information" have been added as a result of a request by the mobile terminal 300 for the "position information" and the "tag information" to be registered in the search list of the server 200. As one example, the setting information included in the setting-information storage area 120b of the image forming apparatus 100 includes the model name of "k5", the host name of "n5", the IP address of "a5", and the serial ID of "s5". These pieces of information are displayed on the search list screen 700. In one example, when the user inputs "x5, y5" as the "position information" and "3F-north east" as the "tag information" from the mobile terminal 300, these pieces of information are also displayed on the search list screen 700.

Figure 5:
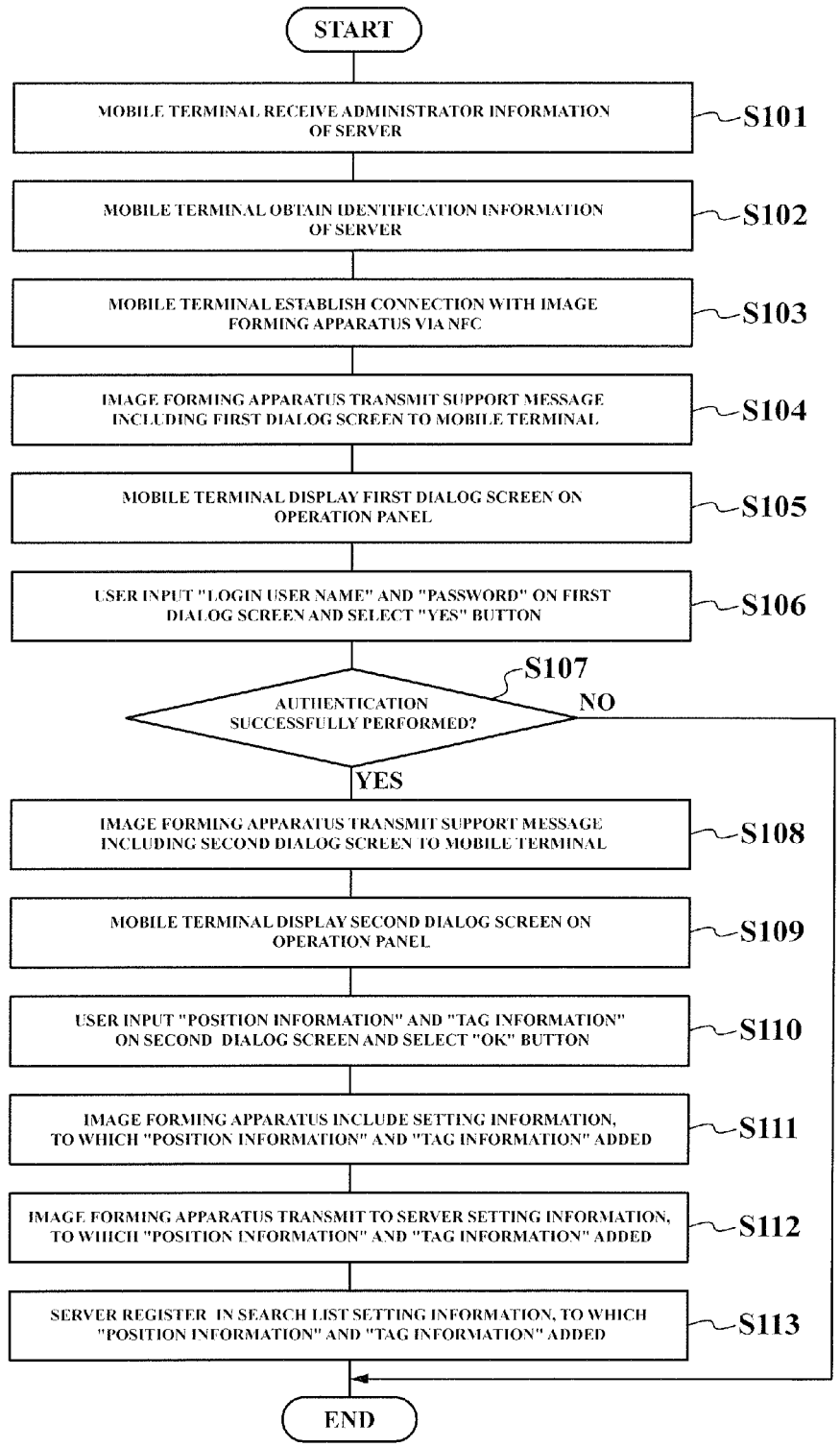
FIG. 5 is a flowchart of an example procedure of registering the image forming apparatus in the search list.

The procedure in which the setting information of the image forming apparatus 100, to which the "position information" and the "tag information" received from the mobile terminal 300 are added, is registered in the search list of the server 200 is depicted in and will be described with respect to FIG. 5.

In step S101, the registration request processor 310a of the mobile terminal 300 establishes connection with the server 200 by using the network communication unit 370 via the access point 400, and receives administrator information, such as a user name and a password, of the server 200.

In step S102, the registration request processor 310a of the mobile terminal 300 obtains identification information, such as an IP address or a host name, with which the server 200 can be uniquely identified in the network 500, from the server 200.

In step S103, when a user puts the mobile terminal 300 that stores the identification information obtained in step S102 at a position close to the image forming apparatus 100, the mobile terminal 300 may establish a connection with the image forming apparatus 100 via near field communication.

In step S104, the support processor 110a of the image forming apparatus 100 may obtain the data of the first dialog screen 610 from the dialog-screen storage area 120a, obtain the setting information from the setting-information storage area 120b, and may also include the data of the first dialog screen 610 and the setting information in a support message for transmission to the mobile terminal 300.

In step S105, upon receiving the support message transmitted from the image forming apparatus 100, the registration request processor 310a of the mobile terminal 300 may obtain the first dialog screen 610 data included in the support message, and may also display the first dialog screen 610 on the operation panel 340. In the support message storing the first dialog screen 610 data, the setting information of the image forming apparatus 100 may be included. Therefore, the setting information of the image forming apparatus 100 is displayed on the first dialog screen 610.

In step S106, the user inputs the "login user name" in the login user name area 611 and the "password" in the password area 612 on the first dialog screen 610 illustrated in FIG. 3A, which may be displayed on the operation panel 340 of the mobile terminal 300. When the user selects the "YES" button 613, the registration request processor 310a transmits the "login user name" and the "password" to the image forming apparatus 100 by using the near field communication unit 330.

In step S107, the image forming apparatus 100 receives the "login user name" and the "password", and determines whether or not the authentication has been successfully performed. If the authentication has been successfully performed ("YES" in the step S107), the process proceeds to the step S108. If the authentication has not been successfully performed ("NO" in the step S107), the user of the mobile terminal 300 is not permitted to register the image forming apparatus 100 in the search list of the server 200, and the process ends.

In step S108, if the determination result in step S107 is "YES", the support processor 110a of the image forming apparatus 100 obtains the data of the second dialog screen 620 from the dialog-screen storage area 120a, obtains the setting information from the setting-information storage area 120b, and includes them in a support message to transmit it to the mobile terminal 300.

In step S109, upon receiving the support message transmitted from the image forming apparatus 100, the registration request processor 310a of the mobile terminal 300 may obtain the second dialog screen 620 data included in the support message, and may display the second dialog screen 620 on the operation panel 340. In the support message storing the second dialog screen 620 data, the setting information of the image forming apparatus 100 is included. Therefore, the setting information of the image forming apparatus 100 may be displayed on the second dialog screen 620.

In step S110, the user may input the "position information" that is obtained by the GPS processor 360 in the position information area 621, and the "tag information" that is attached by the user to identify the image forming apparatus 100 in the tag information area 622 on the second dialog screen 620 illustrated in FIG. 3B, which may be displayed on the operation panel 340 of the mobile terminal 300. When the user selects the "OK" button 623, the registration request processor 310a adds the "position information" and the "tag information" to the setting information of the image forming apparatus 100, and the setting information may be transmitted it to the image forming apparatus 100 via the near field communication unit 330.

In step S111, the support processor 110a of the image forming apparatus 100 includes the setting information, to which the "position information" and the "tag information" have been added, that is received from the mobile terminal 300, in the setting-information storage area 120b. Thus, the setting information included in the setting-information storage area 120b is updated.

In step S112, the support processor 110a of the image forming apparatus 100 may transmit the setting information, to which the "position information" and the "tag information" have been added, that is received from the mobile terminal 300, to the server 200 by using the network communication unit 190.

In step S113, responsive to receiving the setting information, to which the "position information" and the "tag information" have been added, from the image forming apparatus 100, the server 200 may register it in the search list. Thus, the setting information, to which the "position information" and the "tag information" of the image forming apparatus 100 have been added, is registered in the search list, whereby the setting information included in the image forming apparatus 100 and the "position information" and the "tag information" which are input from the mobile terminal 300 may be displayed on the search list screen 700 illustrated in FIG. 4.

As described above, when a user registers the image forming apparatus 100 that is in near user, in the search list, the user puts the mobile terminal 300 at a position close to the image forming apparatus 100, whereby the mobile terminal 300 establishes connection with the image forming apparatus 100 via the near field communication, and the image forming apparatus 100 may transmit the setting information included in the image forming apparatus 100 to the mobile terminal 300. When the user inputs the "position information" and the "tag information" of the image forming apparatus 100 from the mobile terminal 300, the mobile terminal 300 adds the "position information" and the "tag information" to the setting information of the image forming apparatus 100, and transmits it to the image forming apparatus 100. The image forming apparatus 100 may update the included setting information by adding the "position information" and the "tag information", and may also transmit it to the server 200. Responsive to receiving the setting information of the image forming apparatus 100 that includes the additional information, the server 200 may register it in the search list. Thus, the user can register the image forming apparatus 100 that is in front of the user, in the search list of the server 200 by putting the mobile terminal 300 at a position close to the image forming apparatus 100. The displaying of the search list screen 700 on the mobile terminal 300 allows the user to easily select the image forming apparatus 100 by using the "position information" and the "tag information".

While various aspects and embodiments have been disclosed herein, other aspects and embodiments are possible. Other designs may be used in which the above-described components are each present. Note that near field communication may involve hardware that uses magnetic induction to send and receive information between two computing device.

In the device registration system 10 according to the above-described embodiment, the procedure of registering an image forming apparatus 100 in the search list is described. The device is not limited to the image forming apparatus 100, and various types of devices may be registered in one search list.

In addition, according to the above-described embodiment, a user inputs the position obtained by the GPS processor 360 of the mobile terminal 300 in the position information area 621 of the second dialog screen 620. For example, when the second dialog screen 620 is displayed on the mobile terminal 300, the "position information" may be automatically displayed.

Further, according to the above-described embodiment, the example in which the data "3F-north east" which represents the location where the image forming apparatus 100 is installed is used as the tag information is described. For example, the name of the management group that manages the image forming apparatus 100 may be used as the "tag information".

In addition, the position of the image forming apparatus 100 selected by a user may be displayed on a map screen, a floor map screen, or the like by using the "position information" added to the search list. The display thus performed allows the user to easily specify the position where the image forming apparatus 100 is installed.

In addition, either one of, not both of, the "position information" and the "tag information" may be added to the search list.

Further, according to the above-described embodiment, the procedure in which the mobile terminal 300 transmits the setting information, to which the "position information" and the "tag information" are added, to the server 200 via the image forming apparatus 100 is described. The setting information may be transmitted directly from the mobile terminal 300 to the server 200.

In addition, according to the above-described embodiment, the setting information included in the setting-information storage area 120b is transmitted from the image forming apparatus 100 to the mobile terminal 300. The setting information is not transmitted to the mobile terminal 300. In this case, the setting information is transmitted from the image forming apparatus 100 to the server 200; the user operates the image forming apparatus 100 in front of the user so as to check the setting information of image forming apparatus 100; and the "position information" and the "tag information" are transmitted from the mobile terminal 300 to the image forming apparatus 100 and the server 200.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A device registration system comprising a network, an image forming apparatus, a mobile terminal communicatively connected to the network via an access point, and a server,
wherein the image forming apparatus comprises an image forming apparatus near field communication (NFC) unit configured to perform wireless communication with the mobile terminal,
wherein the mobile terminal comprises a mobile terminal NFC unit configured to perform wireless communication with the image forming apparatus,
wherein, when the mobile terminal is positioned close to the image forming apparatus, the mobile terminal is configured to establish a connection with the image forming apparatus via a NFC,
wherein the server is configured to register, in a search list displayed on the mobile terminal, the image forming apparatus that is connected to the mobile terminal and setting information stored in the image forming apparatus,
wherein the setting information includes at least one of a model name, a host name, and an IP address, and a serial ID associated with the image forming apparatus,
wherein, when the mobile terminal establishes the connection with the image forming apparatus, the image forming apparatus NFC unit is configured to transmit to the mobile terminal a first dialog screen data that includes the setting information of the image forming apparatus connected to the mobile terminal and a first input area for authentication information,
wherein the mobile terminal includes an operation panel configured to display the first dialog screen data received from the image forming apparatus, and transmits the authentication information input from the first input area to the image forming apparatus connected to the mobile terminal,
wherein, if an authentication based on the authentication information is valid, the image forming apparatus NFC unit is configured to transmit to the mobile terminal a second dialog screen data that includes the setting information, a second input area for position information, and a third input area for tag information,
wherein the mobile terminal is configured to display the second dialog screen data received from the image forming apparatus on the operation panel, and to transmit the position information and the tag information input from the second input area and the third input area to the image forming apparatus connected to the mobile terminal,
wherein the position information is obtained by a global positioning system processor of the mobile terminal and transmitted from the mobile terminal NFC unit, and
wherein the tag information includes details of the position information having at least one of a floor number of a building and a cardinal direction.

2. The device registration system according to claim 1, wherein the image forming apparatus further comprises a controller configured to (i) update the setting information responsive to receiving the position information of the mobile terminal and (ii) store the updated setting information including the received position information in the storage unit.

3. The device registration system according to claim 2, wherein the controller is further configured to (i) update the setting information responsive to receiving the tag information and (ii) store the updated setting information including the received tag information in the storage unit.

4. The device registration system according to claim 1, wherein the image forming apparatus NFC unit is configured to perform wireless communication with the mobile device NFC unit via magnetic inductance.

5. A device registration method by an image forming apparatus, a mobile terminal communicatively connected to a network via an access point, and a server, comprising:
establishing, via the mobile terminal, a connection with the image forming apparatus using a near field communication (NFC), when the mobile terminal is positioned close to the image forming apparatus;
registering, via the server, in a search list displayed on the mobile terminal, the image forming apparatus that is connected to the mobile terminal and setting information stored in the image forming apparatus, wherein the setting information includes at least one of a model name, a host name, and an IP address, and a serial ID associated with the image forming apparatus,
transmitting, via the image forming apparatus, to the mobile terminal a first dialog screen data that includes the setting information of the image forming apparatus connected to the mobile terminal and a first input area for authentication information, when the mobile terminal establishes the connection with the image forming apparatus;
displaying, via the mobile terminal, the first dialog screen data received from the image forming apparatus on an operation panel;
transmitting, via the mobile terminal, the authentication information input from the first input area to the image forming apparatus connected to the mobile terminal,
transmitting, via the image forming apparatus, to the mobile terminal a second dialog screen data that includes the setting information, a second input area for position information, and a third input area for tag information, if an authentication based on the authentication information is valid;
displaying, via the mobile terminal, the second dialog screen data received from the image forming apparatus on the operation panel; and
transmitting, via the mobile terminal, the position information and the tag information input from the second input area and the third input area to the image forming apparatus connected to the mobile terminal, wherein the position information is obtained by a global positioning system processor of the mobile terminal and transmitted from the mobile terminal NFC unit, and wherein the tag information includes details of the position information having at least one of a floor number of a building and a cardinal direction.

6. The device registration method according to claim 5, further comprising:

updating, via a controller of the image forming apparatus, the setting information responsive to receiving the position information of the mobile terminal; and storing, via the controller of the image forming apparatus, the updated setting information including the received position information in the storage unit.

7. The device registration method according to claim 6, further comprising:

updating, via the controller of the image forming apparatus, the setting information responsive to receiving the tag information; and storing, via the controller of the image forming apparatus, the updated setting information including the received tag information in the storage unit.

8. A non-transitory computer-readable medium having instructions stored thereon that, when executed by a processor, performs a set of functions by an image forming apparatus, a mobile terminal communicatively connected to a network via an access point, and a server, comprising:

establishing, via the mobile terminal, a connection with the image forming apparatus using a near field communication (NFC), when the mobile terminal is positioned close to the image forming apparatus;

registering, via the server, in a search list displayed on the mobile terminal, the image forming apparatus that is connected to the mobile terminal and setting information stored in the image forming apparatus, wherein the setting information includes at least one of a model name, a host name, and an IP address, and a serial ID associated with the image forming apparatus, transmitting, via the image forming apparatus, to the mobile terminal a first dialog screen data that includes the setting information of the image forming apparatus connected to the mobile terminal and a first input area for authentication information, when the mobile terminal establishes the connection with the image forming apparatus;

displaying, via the mobile terminal, the first dialog screen data received from the image forming apparatus on an operation panel;

transmitting, via the mobile terminal, the authentication information input from the first input area to the image forming apparatus connected to the mobile terminal, transmitting, via the image forming apparatus, to the mobile terminal a second dialog screen data that includes the setting information, a second input area for position information, and a third input area for tag information, if an authentication based on the authentication information is valid;

displaying, via the mobile terminal, the second dialog screen data received from the image forming apparatus on the operation panel; and transmitting, via the mobile terminal, the position information and the tag information input from the second input area and the third input area to the image forming apparatus connected to the mobile terminal, wherein the position information is obtained by a global positioning system processor of the mobile terminal and transmitted from the mobile terminal NFC unit, and wherein the tag information includes details of the position information having at least one of a floor number of a building and a cardinal direction.

9. The non-transitory computer-readable medium according to claim 8, wherein the set of functions further comprise:

updating, via a controller of the image forming apparatus, the setting information responsive to receiving the position information of the mobile terminal; and storing, via the controller of the image forming apparatus, the updated setting information including the received position information in the storage unit.

10. The non-transitory computer-readable medium according to claim 9, wherein the set of functions further comprise:

updating, via the controller of the image forming apparatus, the setting information responsive to receiving the tag information; and storing, via the controller of the image forming apparatus, the updated setting information including the received tag information in the storage unit.

* * * * *